United States Patent [19]

Tanaka et al.

[11] Patent Number: 5,151,688
[45] Date of Patent: Sep. 29, 1992

[54] INPUT/OUTPUT DISPLAY PANEL WITH LIGHT PEN

[75] Inventors: Masaru Tanaka; Yutaka Ishii, both of Nara, Japan

[73] Assignee: Sharp Kabushiki Kaisha, Osaka, Japan

[21] Appl. No.: 509,178

[22] Filed: Apr. 16, 1990

[30] Foreign Application Priority Data

Apr. 19, 1989 [JP] Japan ................................ 1-99618

[51] Int. Cl.$^5$ ............................................. G09G 3/02
[52] U.S. Cl. ................................ 340/707; 340/712; 359/59; 359/72
[58] Field of Search ............... 340/707, 706, 708, 712, 340/784; 178/17, 18; 350/333, 342; 341/31; 359/59, 72

[56] References Cited

U.S. PATENT DOCUMENTS

| 4,177,354 | 12/1979 | Mathews | 340/707 |
| 4,679,909 | 7/1987 | Hamada et al. | 350/333 |
| 4,841,290 | 6/1989 | Nakano et al. | 340/707 |
| 4,952,031 | 8/1990 | Tsunoda et al. | 350/342 |

FOREIGN PATENT DOCUMENTS 2067812 7/1981 United Kingdom .
2162673 2/1986 United Kingdom .

Primary Examiner—Alvin E. Oberley
Assistant Examiner—Chanh Nguyen

[57] ABSTRACT

An information input and output apparatus includes an active matrix type display device and switching device. In the information input and output apparatus, the display device displays an image according to an image signal, and has plural pixel electrodes formed in a matrix shape on a transparent substrate. The switching device drives the display device in response to a predetermined voltage to be applied to one of row electrode lines and a predetermined voltage to be applied as the image signal to one of column electrode lines. A photoconductive layer is formed between each of the row electrode lines and each of the column electrode lines at each intersection of the row electrode lines and the column electrode lines in a structure relation to receive light projected from the light pen. When light projected from a light pen is incident onto the photoconductive layer, the resistance thereof decreases. Then, a detection circuit detects a position of the light pen located on the display means responsive to a signal corresponding to the decrease of the resistance of the photoconductive layer which is induced to each of the column electrode lines.

7 Claims, 5 Drawing Sheets

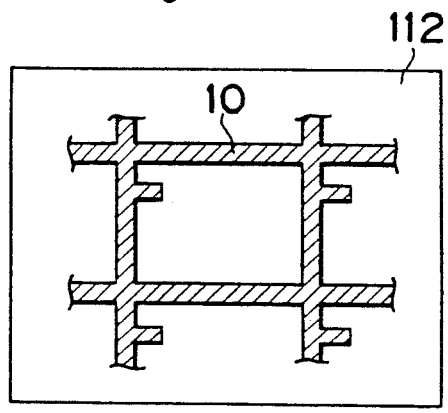
Fig. 5a
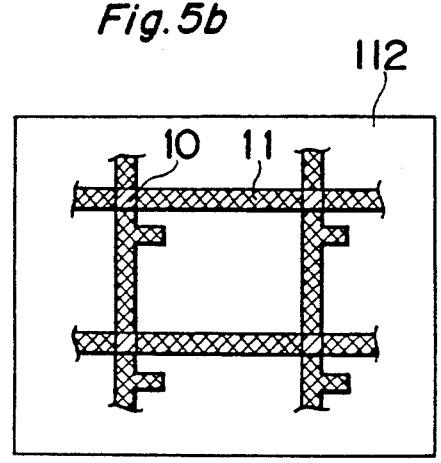
Fig. 5b
Fig. 7(a) Image signal
Fig. 7(b) Discharge pulse
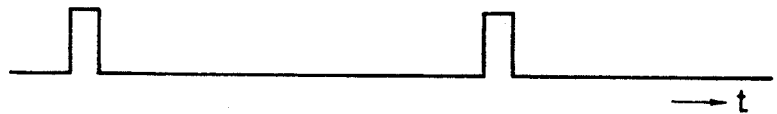
Fig. 7(c) Read start pulse
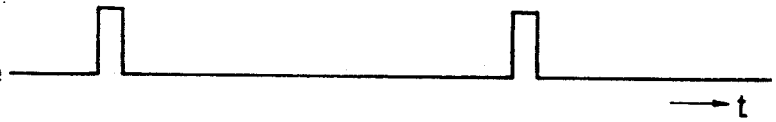
Fig. 7(d) Transfer pulse
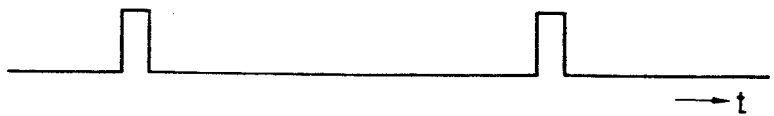
Fig. 7(e) Source start pulse

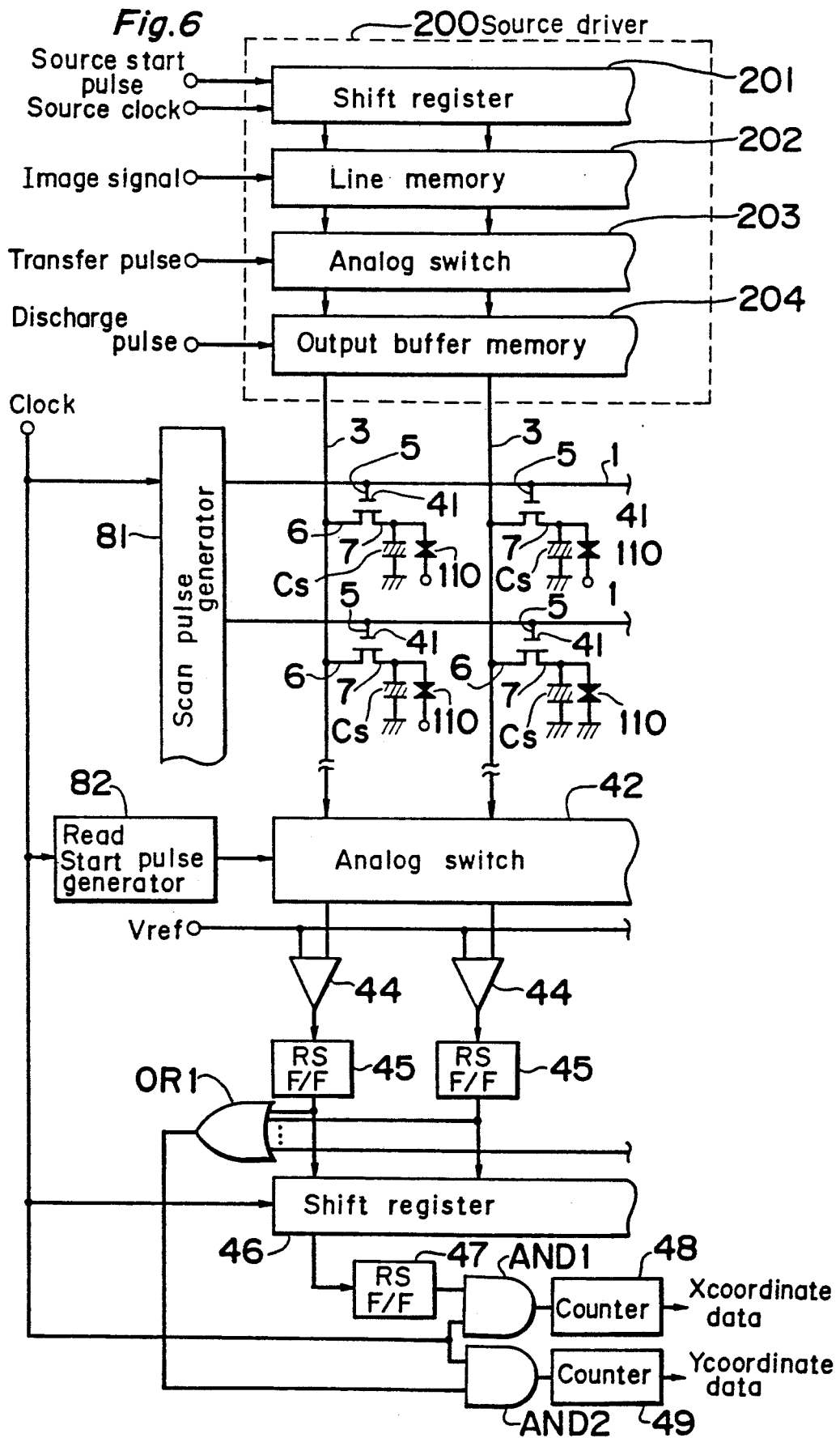

INPUT/OUTPUT DISPLAY PANEL WITH LIGHT PEN

BACKGROUND OF THE INVENTION

1. Field of the Invention

The present invention relates to an information input and output apparatus, more particularly, to an information input and output apparatus comprising an active matrix drive type display device and a light pen.

2. Description of the Related Art

As an information input and output apparatus, conventionally, there has been used an apparatus integrally comprising a separate CRT display device and a separate input apparatus for inputting information using a light pen. The apparatus of this type has a disadvantage that it is not suitable for portable use since the power consumption is relatively large and the size of the apparatus is relatively large.

In order to solve the above problems, there has been proposed in the Japanese patent laid open publication (JP-A) No. 61-6729 published on Jan. 13, 1986, an information input and output apparatus of a completely integral type comprising a combination of a liquid crystal display device and a light emitting type light pen. In the proposed information input and output apparatus, plural photoelectric transducers are arranged inside of an active matrix drive type liquid crystal display device so as to oppose respective pixel electrodes.

FIG. 1 shows a structure of a pixel of the conventional liquid crystal display device of this type.

Thin film transistors (referred to as TFTs hereinafter) for driving the pixel electrodes and photodiodes for detecting light projected from a light pen which are photoelectric transducers each having two terminals are formed on an electrically insulating substrate (not shown) in a matrix shape so as to oppose the pixel electrodes (not shown), respectively.

A TFT comprises a source line 63, a gate line 65, and a drain electrode 67, as shown in FIG. 1. In one pixel of the liquid crystal display device, in addition to these components, a photoconductive semiconductor film 62 for detecting light projected from the light pen is formed on the gate line 61 so as to correspond to each pixel electrode, and a data read line 69 is formed on the photoconductive semiconductor film 62 so as to solidly cross the gate line 61 in parallel to the source line 63.

FIG. 2 shows a conventional circuit for detecting a position of the light pen.

Referring to FIG. 2, after an image signal is inputted to a line memory 43 with a clock signal having a predetermined frequency and is stored therein, the image signal is read out from the line memory 43 and is outputted to each source line 63. Responsive to the clock signal, a scan pulse generator 81 generates a scan pulse and outputs it to the gate lines 61, which is connected to the data read line 69 through the photoconductive semiconductor film 62. The drain electrode of each TFT is connected to a capacitor Cs for storing a signal and each pixel electrode (not shown) which is connected to each opposing electrode (not shown) through the liquid crystal layer 110. Each data read line 69 is connected to one input terminal of each comparator 44, which compares the voltage of the data read line 69 with a reference voltage Vref so as to detect the position of the light pen when a pixel is indicated by the light pen so that a beam of light projected therefrom is incident onto one of photoconductive semiconductor films 62.

The information input and output apparatus of this type shown in FIGS. 1 and 2 has a relatively small power consumption, and can be miniaturized. However, it is necessary to form each data read line 69 in parallel to the source line 63, resulting in twice the number of the electrodes in the column direction of the matrix when each data read line 69 is not formed. In this case, the method of fabricating the liquid crystal display device of this type becomes extremely complicated, and the information input and output apparatus has such a disadvantage that it is extremely difficult to fabricate it. Further, since the structure of the apparatus of this type becomes complicated, there are such problems that an area of each opening on each pixel decreases and the contrast of the displayed image is lowered.

SUMMARY OF THE INVENTION

An important object of the present invention is to provide an information input and output apparatus which can be miniaturized and can be suitable for portable use, and further has a power consumption smaller than the conventional apparatuses.

Another object of the present invention is to provide an information input and output apparatus which does not need any electrode for detecting the position of the light pen.

A further object of the present invention is to provide an information input and output apparatus being capable of displaying an image without lowering the contrast thereof.

In order to accomplish the above objects, according to one aspect of the present invention, there is provided an information input and output apparatus comprising:

display means for display an image according to an image signal, said display means having plural pixel electrodes formed in a matrix shape on a transparent substrate;

plural row electrode lines being formed on said transparent substrate so as to be parallel to each other;

plural column electrode lines being formed on said transparent substrate so as to cross said row electrode lines at substantially right angle in parallel to each other;

switching means for driving said display means responsive to a predetermined voltage to be applied to one of row electrode lines and a predetermined voltage to be applied as said image signal to one of column electrode lines;

a light pen for projecting light onto said display means;

a photoconductive layer being formed between each of said row electrode lines and each of said column electrode lines at each intersection of said row electrode lines and said column electrode lines so as to receive light projected from said light pen; and detecting means for detecting a position of said light pen located on said display means responsive to a signal induced to each of said column electrode lines.

BRIEF DESCRIPTION OF THE DRAWINGS

These and other objects and features of the present invention will become clear from the following description taken in conjunction with the preferred embodiment thereof with reference to the accompanying drawings, in which:

FIG. 5a is a top plan view showing a light shutter filter formed on the display device shown in FIG. 3;

FIG. 5b is a top plan view showing a light shutter filter of a modification of the light shutter filter shown in FIG. 5a;

FIG. 6 is a schematic circuit diagram showing a circuit for detection a position of a light pen and a circuit for driving TFTs which are applied to the display device shown in FIG. 3; and FIG. 7(a)–(e) is a timing chart showing an action of the circuit for detecting the position of the light pen shown in FIG. 6.

DETAILED DESCRIPTION OF THE PREFERRED EMBODIMENT

An active matrix drive type liquid crystal display device of a preferred embodiment of an information input and output apparatus according to the present invention will be described below with reference to the attached drawings.

Figure 3:
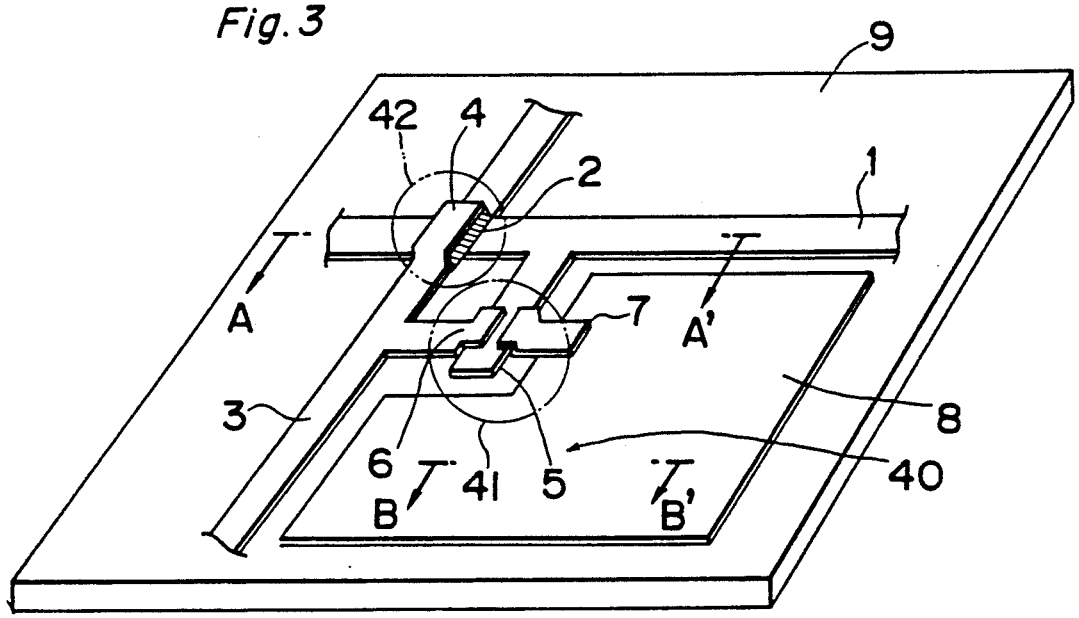
FIG. 3 is a perspective view showing a structure of a pixel of an active matrix drive type liquid crystal display device of a preferred embodiment according to the present invention.
Figure 4A:
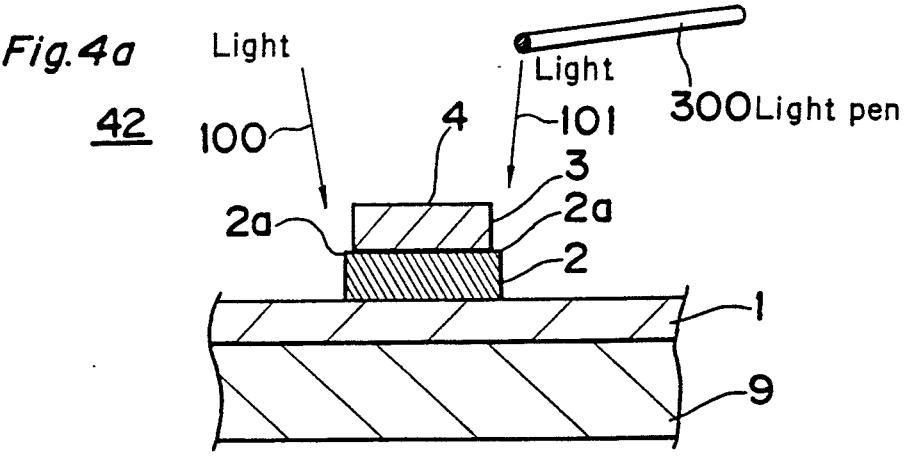
FIG. 4a is a schematic cross sectional view taken on line A–A' of a photodetecting section shown in FIG. 3.
Figure 4B:
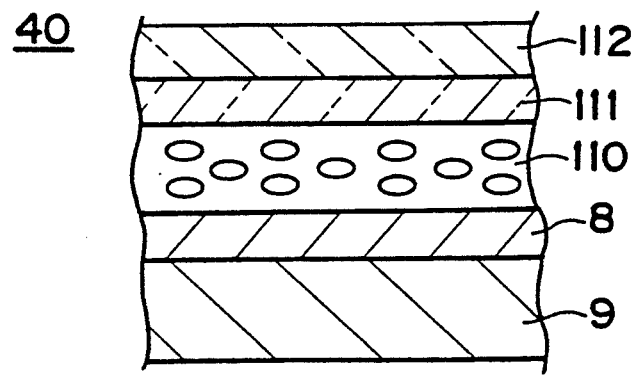
FIG. 4b is a schematic cross sectional view of the liquid crystal device, taken on line B–B' of FIG. 3.

FIG. 3 shows a structure of one pixel of the active matrix drive type liquid crystal display device, FIG. 4a shows a photodetecting section 42 of the liquid crystal display device, and FIG. 4b shows a display section 40 thereof.

Referring to FIG. 3, there are formed in a matrix shape on an electrically insulating glass substrate 9, TFTs 41 for driving the photodetecting section 42 formed at each intersection 4 of electrically conductive gate lines 1 and electrically conductive source lines 3 and for driving the display section 40, each TFT having a gate electrode 5, a source electrode 6 and a drain electrode 7.

A method of fabricating the TFT 41 and the photodetecting section 42 will be described below with reference to FIGS. 3 and 4a. It is to be noted that the method for fabricating the TFT 41 and the photodetecting section 42 of only one pixel will be described hereinafter for convenience of the description.

First of all, the gate line 1 and the gate electrode 5 for one TFT 41 electrically connected to the gate line 1 which are made of an electrically conductive material such as Ta, ITO+Ta are formed on the transparent glass substrate 9. Then, after an area of the intersection 4 of the gate line 1 and the source line 3 is covered by a resist film (not shown) in order that a gate electrically insulating film (not shown) and an i type a-Si layer are not formed on the area of the intersection 4, the gate insulating film is formed thereon, and further, the i type a-Si layer of the TFT 41 is piled up thereon. Thereafter, an n type a-Si layer (not shown) for forming the TFT 41 and a photoconductive semiconductor layer 2 is formed thereon. In order to form the TFT 41 and the photoconductive layer 2, the a-Si layer is etched so that there remain thereon a partial portion of the a-Si layer which becomes a portion of the TFT 41 and another partial portion thereof which becomes the photoconductive layer 2.

Thereafter, a pixel electrode 8 of ITO is formed on the insulating substrate 9, and then, the source line 3 and the source electrode 6 electrically connected to the source line 3 are formed on the insulating substrate 9 so that the source line 3 crosses the gate line 1 at right angles and the source electrode 6 is formed on the a-Si layer of TFT. Then, it is necessary to form the source line 3 on the insulating substrate and the photoconductive layer 2 so that the width of the source line 3 is smaller than that of the photoconductive layer 2, as shown in FIG. 4a, in order that the photoconductive layer 2 of the a-Si layer can receive a beam of light projected from a light pen 300, resulting in that photodetecting portions 2a of the photoconductive layer 2 are formed which are exposed to a beam of light projected therefrom.

Furthermore, the drain electrode 7 of Ta or ITO+Ta is formed on a partial area of the a-Si layer of the TFT 41 and a partial area of the pixel electrode 8. It is to be noted that the gate line 1, the gate electrode 5, the source line 3, the source electrode 6 and the drain electrode 7 may be made of a metal such as Ni, Cr, Mo in place of Ta or ITO+Ta.

On the other hand, in the display section 40 shown in FIG. 4b, there is provided a liquid crystal layer 110 between the pixel electrode 8 and an opposing electrode 111 which is grounded or to which an opposing electrode driving signal is applied. Further, a transparent electrically insulating glass substrate 112 is formed on the opposing electrode 111.

Further, there is formed a light shutter filter 10 on the portions of the glass substrate 112 which oppose to the gate line 1, the gate electrode 5 and the source line, as shown in FIG. 5a. The light shutter filter 10 passes therethrough substantially only light having a predetermined wavelength substantially equal to that of light projected from the light pen 300, and shuts light having a relatively low intensity like that of the surrounding light. Alternately, shown in FIG. 5b, the light shutter filter 10 may be formed on the portions of the glass substrate 112 which oppose to the photodetecting section 42, and a light shielding member 11 of black color for shutting all the light may be formed on the other portions than the portions where the light shutter filter 10 is formed.

The light shutter filter 10 shuts light having wavelengths other than transmitted wavelength. Further, the light shutter filter 10 has a property of attenuating the light so that the electrons which exist in the valence band of the photoconductive layer 2 are hardly excited by the surrounding light. Therefore, upon a normal liquid crystal display, the surrounding light hardly influence the liquid crystal display. On the other hand, the light shutter filter 10 passes a beam of light having an energy projected from the light pen 300, which is larger than that of the surrounding light.

The light pen 300 comprises a light source and a lens which are mounted in a pen-shaped case. As the light source thereof, there is used a light source having a narrow spectrum such as a light emitting diode (LED), a semiconductor laser. Light emitted from the light source is converged by the lens which is mounted at the end of the light pen 300, and a beam of light is projected onto the liquid crystal display device. As shown in FIG. 4a, a beam of light projected from the light pen 300 is incident onto the photodetecting portions 2a of the photoconductive layer 2 which has a width larger than that of the source line 3, through the light shutter filter 10 shown in FIG. 5a.

Figure 2:
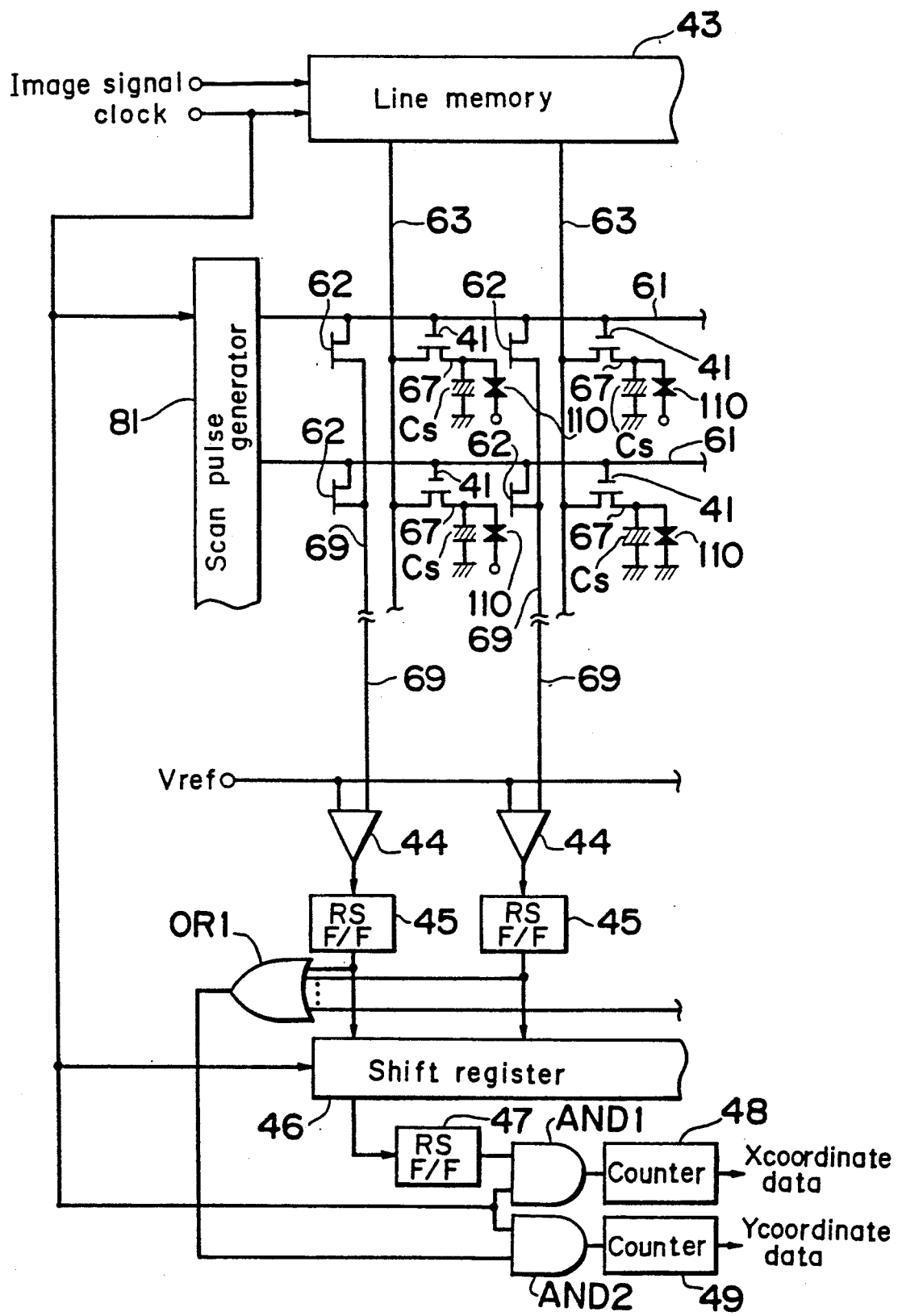
FIG. 2 is a schematic circuit diagram showing a conventional circuit for detecting a position of a light pen and a conventional circuit for driving TFTs which are applied to the display device shown in FIG. 1.

FIG. 6 shows a circuit for driving the TFTs 41 and a circuit for detecting the position of the light pen 300 which are applied to the liquid crystal display device and FIG. 7 is a timing chart showing the action of the circuit for detecting the position of the light pen 300. In FIG. 6, the same components as that shown in FIG. 2 are denoted by the same numerical references as that shown in FIG. 2.

Referring to FIG. 6, the liquid crystal layer 110 is driven by a line sequential drive method of an active matrix drive manner which is known to those skilled in the art. Responsive to a clock signal, a scan pulse generator 81 generates a scan pulse and outputs it to the gate lines 1 sequentially. On the other hand, an image signal of one horizontal scan period is latched by a line memory 202 according to a sampling signal outputted from a serial to parallel shift register 201. It is to be noted that the sampling operation of the image signal is started responsive to a source start pulse inputted to the shift register 201.

After the latch operation of the image signal of one line to be outputted for the next period has been completed, data stored in an output buffer memory 204 which outputs the data at present are cleared responsive to a discharge pulse. Thereafter, the image signal of one horizontal scan period having been latched by the line memory 202 is transferred to the output buffer memory 204 at a predetermined timing responsive to a transfer pulse.

At that time, the TFT 41 which connected to the gate line 1 to which the scan pulse is applied by the scan pulse generator 81 is turned on so as to active the liquid crystal layer 110 which is disposed on the pixel electrode 8. On the other hand, when a beam of light is projected onto the photodetecting section 42 from the light pen 300, the resistance of the photoconductive layer 2 decreases, and then, the scan pulse having been applied to the gate line 1 is leaked and transferred into the the source line 3. In the present preferred embodiment, the leaked signal is utilized as a position information signal of the light pen 300.

There is provided a time interval for reading the position information signal between the aforementioned discharge pulse and the aforementioned transfer pulse, and the position information signal of the light pen 300 is read out from the source line 3 responsive to a read start pulse which is generated by a read start pulse generator 82 responsive to the clock signal. Namely, responsive to the read start pulse, analog switches 42 are turned on, and then, the position information signal is transferred from the source line 3 to the comparators 44 through the analog switches 42. Thereafter, the position information signal is compared with a reference voltage Vref and is amplified by the comparators 44, and then, the position information signal is latched by RS type flip flops 45. The signals outputted from respective flip flops 45 are inputted to an OR gate OR1.

The signals outputted from respective comparators 44 are reset to the Low level or "0" at the beginning of each line. Thereafter, when a beam of light projected from the light pen 300 is incident onto the photoconductive layer 2 of the photodetecting section 42 of the liquid crystal display device, the signal outputted from the comparator 44 which is connected through the analog switch 42 to the source line 3 changes to the High level or "1", and the signal outputted from the OR gate OR1 becomes the High level or "1". The signal outputted from the OR gate OR1 is inputted to a counter 49 through an AND gate AND2 which is controlled to be gated according to the clock signal. The scan pulses while the signal outputted from the OR gate OR1 is the Low level or "0" is counted by the counter 49, and then, data of the number of the counted scan pulses are outputted as Y coordinate data.

On the other hand, the signals latched by respective RS type flip flops 45 are transferred to another parallel to serial shift register 46, and the signals outputted from the shift register 46 are outputted to a counter 48 through an RS type flip flop 47 and one input terminal of an AND gate AND1, to another input terminal of which the clock signal is inputted. Then, the clock signal is counted by the counter 48 until the signal outputted from the flip flop 47 becomes the High level or "1" for the first time, data of the number of the counted clock signal are outputted as X coordinate data.

The surrounding light can be prevented from influencing to the aforementioned operation for detecting the position of the light pen 300 by adjusting the sensitivity of each of the light shutter filter 10 and the photoconductive layer 2. However, if the surrounding light influences thereto, it is necessary to adjust the reference voltage Vref which is inputted to the comparators 44. Alternately, the light emitted from the light source of the light pen 300 may be flushed with a predetermined period, and only the signal synchronous with the flushed light may be read out from the source lines 3 and amplified, resulting in the position information signal.

Figure 1:
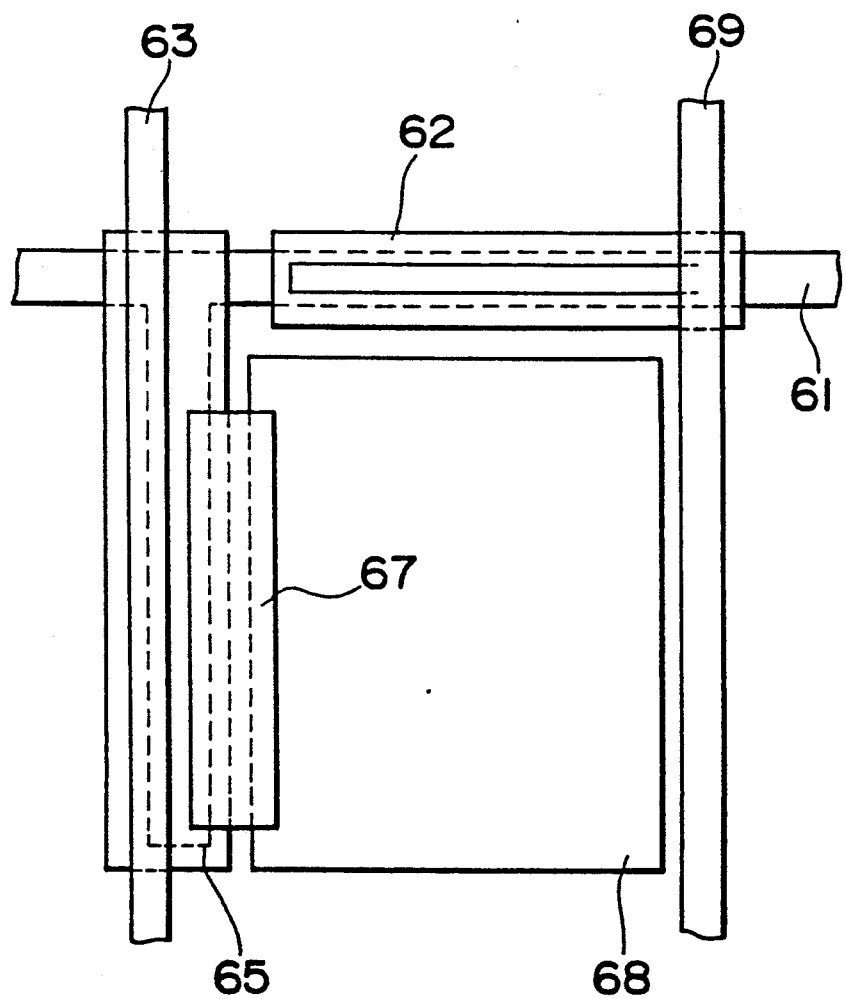
FIG. 1 is a top plan view showing a structure of a pixel of a conventional active matrix drive type liquid crystal display device.

According to the preferred embodiment, the photoconductive layer 2 is formed between the gate line 1 and the source line 3 at the intersection 4 of these lines 1 and 3. Therefore, it is not necessary to provide the data read lines 69 for reading out the position information signal of the light pen 300. Then, the structure of the liquid crystal display device having the photodetecting section 42 becomes simpler than that of the conventional display device shown in FIGS 1 and 2. Further, the area of the opening of each pixel can be prevented from decreasing, and the contrast of the displayed image can be prevented from lowered. The liquid crystal display device of the preferred embodiment can be miniaturized as compared with the conventional apparatus, and is suitable for portable use and has a power consumption smaller than the conventional apparatus.

In the present preferred embodiment, the TFTs 41 are formed on the glass substrate 9. However, the present invention is not limited to this. There can be used a liquid crystal display device of reflection type mode wherein the TFTs 41 are formed on a semiconductor substrate of SI.

In the present preferred embodiment, the photoconductive layer 2 of the photodetecting section 42 is made of a-Si, however, the present invention is not limited this. The photoconductive layer 2 may be made of a photoconductive material such as CdS, GaAs, SeTe.

In the present preferred embodiment, the RS flip flops 45 are used. However, the present invention is not limited to this. Peak holding circuits may be used in place of the flip flops 45.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An information input and output apparatus comprising:
    display means for displaying an image according to an image signal, said display means having plural pixel electrodes formed in a matrix shape on transparent substrate;
    plural row electrode lines being formed on said transparent substrate so as to be parallel to each other;
    plural column electrode lines being formed on said transparent substrate, parallel to each other, so as to cross said row electrode lines with an intersecting angle of substantially right angles;
    switching means for driving said display means responsive to a predetermined voltage to be applied to one of the row electrode lines and a predetermined voltage to be applied as said image signal to one of the column electrode lines;
    a light pen for projecting light onto said display means;
    a photoconductive layer, having a predetermined length and width, being formed only between each of said row electrode lines and each of said column electrode lines at each intersection of said row electrode lines and said column electrode lines, the electrode line located above said photoconductive layer being of a lesser width than the width of the photoconductive layer, so that the photoconductive layer can effectively receive light projected from said light pen; and
    detecting means for detecting a position of said light pen located on said display means to a signal induced to each of said column electrode lines.

2. The apparatus as claimed in claim 1, further comprising light shutter means for passing substantially only light projected from said light pen therethrough so as to be incident onto said photoconductive layer, said light shutter means being formed so as to oppose to said row electrode lines and said column electrode lines.

3. The apparatus as claimed in claim 1, further comprising:
    light shutter means for passing substantially only light projected from said light pen therethrough so as to be incident onto said photoconductive layer, said light shutter means being formed at said intersections of said row electrode lines and said column electrode lines; and
    light shielding means for completely blocking all light, said light shielding means being formed in areas except for said intersections and surrounding of said intersections along said row electrode lines and said column electrode lines.

4. The apparatus as claimed in claim 1, wherein said display means is a liquid crystal display.

5. The apparatus as claimed in claim 1, wherein said switching means is a thin film transistor; each of said row electrode lines is a gate line which is connected to a gate electrode of said thin film transistor; and each of said column electrode lines is a source line which is connected to a source electrode of said thin film transistor.

6. The apparatus as claimed in claim 5, wherein the electrode line located above said photoconductive layer is the source line.

7. The apparatus as claimed in claim 1, wherein the photoconductive layer has first and second surfaces, with said first and second surfaces being in physical contact with said row and column electrode lines respectively.

* * * * *